US012632011B2

(12) United States Patent
Damasko

(10) Patent No.: US 12,632,011 B2
(45) Date of Patent: May 19, 2026

(54) SPRING-LOADED ZEROING DEVICE

(71) Applicant: Damasko Präzisionstechnik GmbH & Co. KG, Regensburg (DE)

(72) Inventor: Christoph Damasko, Regensburg (DE)

(73) Assignee: Damasko Präzisionstechnik GmbH & Co. KG (DE)

( * ) Notice: Subject to any disclaimer, the term of this patent is extended or adjusted under 35 U.S.C. 154(b) by 254 days.

(21) Appl. No.: 18/508,425

(22) Filed: Nov. 14, 2023

(65) Prior Publication Data

US 2024/0319676 A1 Sep. 26, 2024

(30) Foreign Application Priority Data

Nov. 15, 2022 (EP) .................................... 22207387

(51) Int. Cl.
*G04F 7/08* (2006.01)

(52) U.S. Cl.
CPC .................................. *G04F 7/0814* (2013.01)

(58) Field of Classification Search
CPC ...... G04F 7/0814; G04F 7/062; G04F 7/0804; G04F 7/0823; G04F 8/02; G04F 7/0847; G04F 10/00; G04F 7/0809; G04B 11/04; G04C 3/146; G04C 10/00
See application file for complete search history.

(56) References Cited

U.S. PATENT DOCUMENTS

| | | | | |
|---|---|---|---|---|
| 7,029,169 B2 * | 4/2006 | Takahashi | ............. | G04F 7/0819 368/110 |
| 7,331,706 B2 * | 2/2008 | Gabathuler | ........... | G04F 7/0809 368/106 |
| 11,256,218 B2 * | 2/2022 | Heinz | .................. | G04F 7/0823 |

FOREIGN PATENT DOCUMENTS

| | | |
|---|---|---|
| DE | 202017107668 U1 | 3/2018 |
| EP | 0996043 A1 | 4/2000 |

* cited by examiner

*Primary Examiner* — Edwin A. Leon
(74) *Attorney, Agent, or Firm* — Frank H. Foster; Kremblas & Foster

(57) ABSTRACT

A zeroing device 100 for a chronograph, having at least one zeroing heart 110, 120, a zeroing unit 200, which has a zeroing lever arm 210 and a zeroing lever bar 220, a first end 221 of which contacts the zeroing heart 110, 120, and a control means 130 which interacts with the zeroing lever arm 210. A zeroing of the zeroing unit 200 is effectuated by actuating the control means 130. This enables low production and maintenance costs and allows the counter hands to be reset to the zero position in a safer, more durable, and user-friendly manner. The zeroing device 100 includes a first compression spring 140 which is supported on the zeroing lever arm 210 and is) operatively connected to the control means 130. The control means 130 interacts indirectly, via the first compression spring 140, with the zeroing unit 200.

16 Claims, 6 Drawing Sheets

SPRING-LOADED ZEROING DEVICE

BACKGROUND OF THE INVENTION

The invention relates to a zeroing device for a movement of a chronograph, comprising at least one zeroing heart, a zeroing unit, and a control means. The zeroing unit has a zeroing lever arm and a zeroing lever bar. A first end of the zeroing lever bar is designed to contact the at least one zeroing heart. The control means cooperates with the zeroing lever arm, wherein zeroing of the zeroing unit is effectuated by actuating the control means.

The invention also relates to a chronograph having such a zeroing device, the center second counter hand and center minute counter hand of which are each mounted rotatably around the main axis of the movement of the chronograph.

A chronograph is usually understood to mean analog, mechanical watches or wristwatches having a stopwatch function. For this purpose, the movement includes additional counter hands, for example a second and a minute counter hand, which are rotatable independently of the hands intended to display the time. The timekeeping is started and stopped using a start/stop button. By means of a reset button, the second and minute counter hands can be reset to their initial zero position, in which the hands are directed at the number zero on the dial, in order to enable renewed timekeeping. The second and minute counter hands are reset to the zero position by means of a zeroing device, which is another component of the chronograph movement.

Such a zeroing device for a chronograph is known from published publication US 2009/0086583 A1. The zeroing device comprises two, usually heart-shaped cams, also referred to as zeroing hearts, which are connected to the chronographic counters, for example a second and minute counter hand, in a torque-transmitting manner. A bar, also known as a zero lever bar, has a hammer at each end. When a hammer hits the associated cam, the latter is forced into a position in which the stop surface of the cam bears on the complementary stop surface of the hammer. The stop surface of the cam and the hand position are aligned with each other so that the hand is then in the zero position. This position, in which the bar or its ends or hammers bear on the heart-shaped cams in order to cause them to rotate and thus reset the pointers to the zero position, is referred to as the zero position.

The bar having the two hammers is movably connected to a zeroing lever, also called a zeroing lever arm. By means of a spring that exerts a restoring spring force on the zeroing lever, the bar and the zeroing lever are held in a release position in which the two hammers cannot come into contact with the heart-shaped cams. By actuating a button or reset button, the bar and the zeroing lever can be moved to effectuate their zeroing. As previously described, in the zero position, the hammers act on the heart-shaped cams, thereby returning the hands to the zero position. The force applied by the user to the button is transmitted to the zeroing device via an interconnected control means, here also implemented as a lever. The user has to overcome the opposing restoring spring force for this purpose. The disadvantage of this arrangement is that the force or impulse applied by the user against the restoring spring force is often not sufficient to ensure reliable rotation of the cams and thus resetting of the hands. In order to return the hands to the zero position, the user may often have to press the button several times.

The patent specification U.S. Pat. No. 9,164,492 B2 also discloses a zeroing device for a chronograph. The zeroing device shown here comprises a total of three zeroing cams, which correspond to respective zeroing bars or zeroing hammers. Each hammer has a stop surface at a first end that is complementary to the shape of the respective associated zeroing cam. The individual hammers are kinetically connected to one another, but are rotatable independently about their respective axes. By means of a return spring and a return bar, the hammers are initially to be held in an idle position in which there is no engagement with the associated zeroing cams. Each of the hammers is also assigned a respective hammer spring, the fastening end of which is firmly connected to the second end of the hammer. The other, free end of the hammer springs is supported on respective pins of a winding and releasing means.

By actuating the reset button, the winding and releasing means are to be deflected via a control means in such a way that the hammer springs supported thereon are tensioned or "wound up", which results in a respective pre-tensioning of the individual hammers. The positioning of the hammers themselves initially remains unchanged. Only when the reset button is actuated further is a position of the reset bar to be reached in which the hammers are released and pivoted by the pre-tensioned springs into contact with the respective zeroing cams. The pre-tension is intended to increase the impulse on the zeroing cams and thus achieve the zero position more reliably. The zeroing device shown is complicated and has a large number of individual components, which substantially increases not only the costs but also the maintenance effort and the need for repairs. Each of the zeroing cams is coupled to a separate zeroing hammer, which is why the individual arms are often reset to the zero position with a time delay. In order to achieve a zero position, the user has to overcome not only the force of the return spring, but also the opposing force of each individual hammer spring. This results in a comparatively high level of effort and therefore reduces the ease of operation.

Finally, a zeroing device for a chronograph can also be found in utility model specification DE 20 2017 107 668 U1, which has as essential components a second zeroing heart, a minute zeroing heart, and a zeroing unit having a zeroing lever arm and a zeroing lever bar. The zeroing lever bar is designed to stop with its first end or "hammer" against the second zeroing heart and to stop with its second end or "hammer" against the minute zeroing heart, so that they are rotated into a position as previously described when the respective ends are in contact, in which the respective connected arms are kept in their zero position. The chronograph disclosed here is equipped with a center second counter hand and a center minute counter hand, which, like the hands intended to display the time, rotate around the central main axis of the movement.

The zeroing unit is held via a control cam in the release position, in which the two ends of the zeroing lever bar are not in contact with the second or minute zeroing heart. By actuating the reset button, the control cam can be rotated so that the zeroing lever arm is released and the zeroing lever bar is moved in the direction of the zeroing hearts by a compression spring applied to the zeroing lever arm, indirectly by pivoting the zeroing lever arm. To assist the force applied by the compression spring, a linkage connected to the control cam, in the form of a second zeroing unit, acts directly on the zeroing lever arm, so that the rotation of the control cam also causes the zeroing lever arm to pivot. Since the zero position of the zeroing unit is achieved on the one hand by the pre-tension of the compression spring and on the other hand via the linkage by a rotational movement of the control cam initiated by the user, the arms are to be reset to the zero position more reliably. For this purpose, the linkage is mounted in a stationary manner in the movement of the chronograph and converts the rotational movement of the control cam into a directed pressure movement on the second or minute zeroing heart. However, the linkage comprises multiple individual components that are mounted so they are movable relative to one another for this purpose. The disadvantages are therefore the increased maintenance effort and the increased production costs due to the additional components of the linkage.

It is the object of the present invention to eliminate the disadvantages of the prior art and to provide a zeroing device for a chronograph which enables cost-effective production and low maintenance costs while at the same time allowing the counter hands to be reset to the zero position in a safer, more durable, and user-friendly manner.

The object is achieved by a zeroing device according to claim 1 and a chronograph having a zeroing device according to claim 16.

SUMMARY OF THE INVENTION

A zeroing device according to the invention of the type described in more detail at the outset is characterized in that the zeroing device comprises a first compression spring which is supported on the zeroing lever arm and is operatively connected to the control means, wherein the control means interacts indirectly with the zeroing unit via the first compression spring.

By actuating the control means, the zeroing unit can be transferred from a release position in which the first end of the zeroing lever bar cannot come into contact with the at least one zeroing heart, into a zero position in which the first end of the zeroing lever bar bears on the at least one zeroing heart. According to the invention, the control means does not act directly on the zeroing lever arm, but rather indirectly via the first compression spring for this purpose. There is an operative connection between the control means and the first compression spring, so that when the control means is actuated, the first compression spring is moved and additionally deflected, in particular compressed or tensioned. A significant advantage here is that the first compression spring fulfills two functions at the same time. The compression spring is provided, on the one hand, for spring loading of the zeroing lever arm by elastic deformation and, on the other hand, for transmitting the movement of the control means to the zeroing lever arm. For this purpose, the zeroing lever arm and the first compression spring are aligned with one another in such a way that the first compression spring is supported on the zeroing lever arm. By continuously actuating the control means, the pressure or the spring force on the zeroing lever arm is increased, by which the zeroing of the zeroing unit is effectuated and the first end of the zeroing lever bar is brought into contact with the at least one zeroing heart.

Unlike in the prior art, the first compression spring is thus used to transmit force from the control means to the zeroing lever arm in order to assist the movement of the zeroing unit from the release position to the zero position. A further advantage is that even after the zero position of the zeroing unit has been effectuated, the spring force of the first compression spring can continue to load on the zeroing lever arm, by which the zeroing unit is permanently forced into the zero position or is held therein. In this way, the rotation of the at least one zeroing heart required to zero position the counter hands of the chronograph can be achieved more reliably and by only actuating the reset button once. Because the use of the compression spring replaces more complex constructions, such as linkages or the like, the total number of components of the zeroing device, in particular the number of movable or mutually movable components, can be reduced at the same time, by which the production costs and maintenance requirements are drastically reduced.

Advantageous embodiments are claimed in the dependent claims and are explained in more detail below.

Optionally, the zeroing lever arm can also be loaded with a pre-tension by the first compression spring in the release position, i.e., before actuating the control means in order to effectuate the zero position. According to an advantageous embodiment of the invention, the zeroing lever arm therefore has a bolt-like or pin-like stop on which the first compression spring is supported. Depending on the positioning of the bolt-like or pin-like stop on the zeroing lever arm, relative to the setting or position of the first compression spring, the spring force acting on the zeroing lever arm can be increased or reduced as necessary, by which in particular the above-mentioned pre-tension is implementable.

In a refinement of this embodiment of the invention, the bolt-like or pin-like stop is designed as an eccentric for fine adjustment of the spring force exerted by the first compression spring on the zeroing lever arm. In particular, the stop can be seated eccentrically in a receptacle of the zeroing lever arm, due to which its positioning on the zeroing lever arm can be changed by turning the eccentric, for example using a screwdriver. In this way, the spring force of the first compression spring, which is supported on the bolt-like or pin-like stop, is adjustable with high precision for fine adjustment of the zeroing device.

According to a further embodiment of the invention, the first compression spring has a fastening end and a free end, wherein the fastening end is directly connected to the control means and the free end is supported on the zeroing lever arm. In this variant of the invention, the first compression spring is preferably designed as a U-shaped bow spring. The fastening end connected to the control means is then arranged on one leg and the free end, which is supported on the zeroing lever arm, is arranged on the other leg. When the control means is actuated in order to effectuate the zero position of the zeroing unit, the free end of the first compression spring is consequently deflected in the direction of the fastening end, i.e., in the elastically deformed state of the first compression spring, the distance of the two legs from one another is reduced.

Preferably, the zeroing lever arm and the first compression spring carry out a movement in opposite directions to one another by actuating the control means in order to effectuate the zeroing of the zeroing unit.

For this purpose, the first compression spring can be connected to the control means, in particular in a torque-transmitting manner, and the zeroing lever arm can be connected at its second end to the zeroing lever bar and can be mounted at its first end so that it is rotatable and/or pivotable around a zeroing lever arm pivot point, so that a rotational and/or pivot movement of the control means around its axis of rotation results in a rotational and/or pivot movement of the compression spring in the same direction and a rotational and/or pivot movement of the zeroing lever arm in the opposite direction. Preferably, the zeroing lever bar is linked on the second end of the zeroing lever arm so it is freely pivotable.

In an advantageous variant of the invention, this is achieved in that the first compression spring is then supported on the zeroing lever arm in an area between the connection to the zeroing lever bar and the rotatable and/or pivotable mounting. Due to the rotational movement transmitted by the control means to the compression spring, the compression spring is pivoted by a small amount in a first rotational direction, which corresponds to the clockwise direction of the chronograph. The free end of the first compression spring acts on the zeroing lever arm in this case, by which it is pivoted around the zeroing lever arm pivot point, specifically in a second rotational direction, counter to the first rotational direction and counterclockwise. Due to the action of the first compression spring, the first end of the zeroing lever arm, which is connected to the zeroing lever bar, is pivoted in the direction of the at least one zeroing heart, due to which the zeroing lever bar comes into contact with the at least one zeroing heart, i.e., the zeroing of the zeroing unit is effectuated. By actuating the start/stop button, the zero position can be released and the zeroing unit can be returned to the release position, which enables renewed timekeeping.

The control means itself can be actuated via a reset button, which protrudes from the housing of the chronograph for operation by a user. For example, by means of a transmission mechanism, the longitudinally acting force of the reset button is converted into a rotational movement of the control means and the control means is pivoted around its axis of rotation.

In an optional variant of the invention, the zeroing of the zeroing unit is assisted by a second compression spring, which is mounted in a stationary manner in the movement of the chronograph and the free end of which is also supported on the zeroing lever arm, exerting a spring force that effectuates the zeroing of the zeroing unit. Preferably, the second compression spring is in a deflected position, provided that the zeroing unit is in the release position, so that the second compression spring exerts a permanent pressure or a spring force on the zeroing lever arm, which forces the zeroing unit into the zero position.

By way of the first compression spring and additionally the second compression spring, the zero position of the zeroing unit is effectuated redundantly when the control means is actuated, wherein the first compression spring is elastically deformed, in particular deflected or tensioned, by the movement of the control means, and the second compression spring relaxes from a deflected position in the direction of its idle position. For this purpose, both the first and the second compression spring are supported on the zeroing lever arm; the zeroing lever arm is double spring-loaded. Due to the double spring-loading of the zeroing unit, its zero position can be held safely and permanently when the reset button is actuated once, which resets the counter hands of the chronograph to a clear zero position. By actuating the start/stop button, the zero position can be released and the zeroing unit can be returned to the release position.

In an expedient embodiment of the invention, the first compression spring and the second compression spring are offset from one another with respect to the Z coordinate direction of the movement of the chronograph. In particular, the first compression spring is offset from the zeroing lever arm with respect to the Z coordinate direction and the second compression spring is arranged in a common plane with the zeroing lever arm with respect to the Z coordinate direction. Structurally, this can be implemented, for example, by supporting the first compression spring on a bolt-like or pin-like stop of the zeroing lever arm and the second compression spring on its frontal outer contour.

In an optional variant of the invention, in particular in order to hold the zeroing unit in the release position against the spring force of the second compression spring, the control means is in locking engagement with the first end of the zeroing lever arm. The engagement can be released by actuating the control means to effectuate the zeroing of the zeroing unit. For example, this can be implemented structurally in that the second end of the zeroing lever arm has a receptacle and the control means has a complementary contour for engaging in the receptacle of the zeroing lever arm. When the control means is actuated, it is moved, in particular rotated, by which the engagement is released and the locking of the zeroing lever arm is released.

Finally, according to a variant of the invention, the zeroing device can have a third spring, in particular a detent spring, which is mounted in a stationary manner in the movement of the chronograph and the free end of which interacts with the control means. Preferably, by actuating the control means, the free end of the third spring comes into an engagement that holds the control means in the position that effectuates the zero position. The third spring is designed in particular as a detent spring and has, for example, at the free end a V-shaped lug, which interacts with a complementary contour of the control means or snaps into it and thus prevents the movement, in particular rotation, of the control means. The third spring therefore further secures the zero position of the zeroing unit. By actuating the start/stop button, the zero position can be released and the zeroing unit can be returned to the release position, which enables renewed timekeeping.

According to an optional refinement of this variant of the invention, the third spring can expediently be arranged offset from the zeroing lever arm and offset from the first compression spring with respect to the Z coordinate direction of the movement of the chronograph. Preferably, the first compression spring is arranged in a first, lower plane with respect to the Z coordinate direction, the zeroing lever arm, the second compression spring and the control means in a second, common plane, and the third spring in a third, upper plane. The first and second compression springs are in operative connection with the zeroing lever arm via their respective free ends or are supported thereon; the free end of the third spring interacts with the control means. The second compression spring and the third spring are each mounted in a stationary manner in the movement of the chronograph with their other end, the fastening end; the fastening end of the first compression spring is in particular connected to the control means in a fixed or torque-transmitting manner.

Actuation of the control means therefore causes a movement, in particular rotation, of the first compression spring, which is transferable to the zeroing lever arm via its free end. Optionally, the zeroing lever arm is additionally released from the locked release position and the third spring engages to lock the zero position.

The object of the invention stated at the outset is also achieved by a chronograph having a zeroing device according to one of the previously described embodiment variants. A chronograph according to the invention comprises a center second counter hand and a center minute counter hand, each of which is rotatably mounted around the main axis of the movement for timekeeping. The center second counter hand is connected to a second wheel and the center minute counter hand is connected to a minute wheel. According to the invention, the chronograph is characterized in that the zeroing lever bar of the zeroing device has a first end for contact with a first zeroing heart, namely a second zeroing heart, and a second end for contact with a second zeroing heart, namely a minute zeroing heart. The zeroing of the zeroing unit can be effectuated by actuating the control means, wherein the control means interact with the zeroing unit via the first compression spring supported on the zeroing lever arm. The second zeroing heart interacts directly with the second wheel in a torque-transmitting manner and the minute zeroing heart interacts indirectly with the minute wheel in a torque-transmitting manner in order to reset the center second counter hand and the center minute counter hand to their zero position.

Further details, features, (sub-) combinations of features, advantages, and effects on the basis of the invention result from the following description of a preferred exemplary embodiment of the invention and the drawings. These show in

BRIEF DESCRIPTION OF THE SEVERAL VIEWS OF THE DRAWINGS

The figures are merely exemplary in nature and only serve to understand the invention. The same elements are given the same reference numerals.

DETAILED DESCRIPTION OF THE INVENTION

Figure 1:
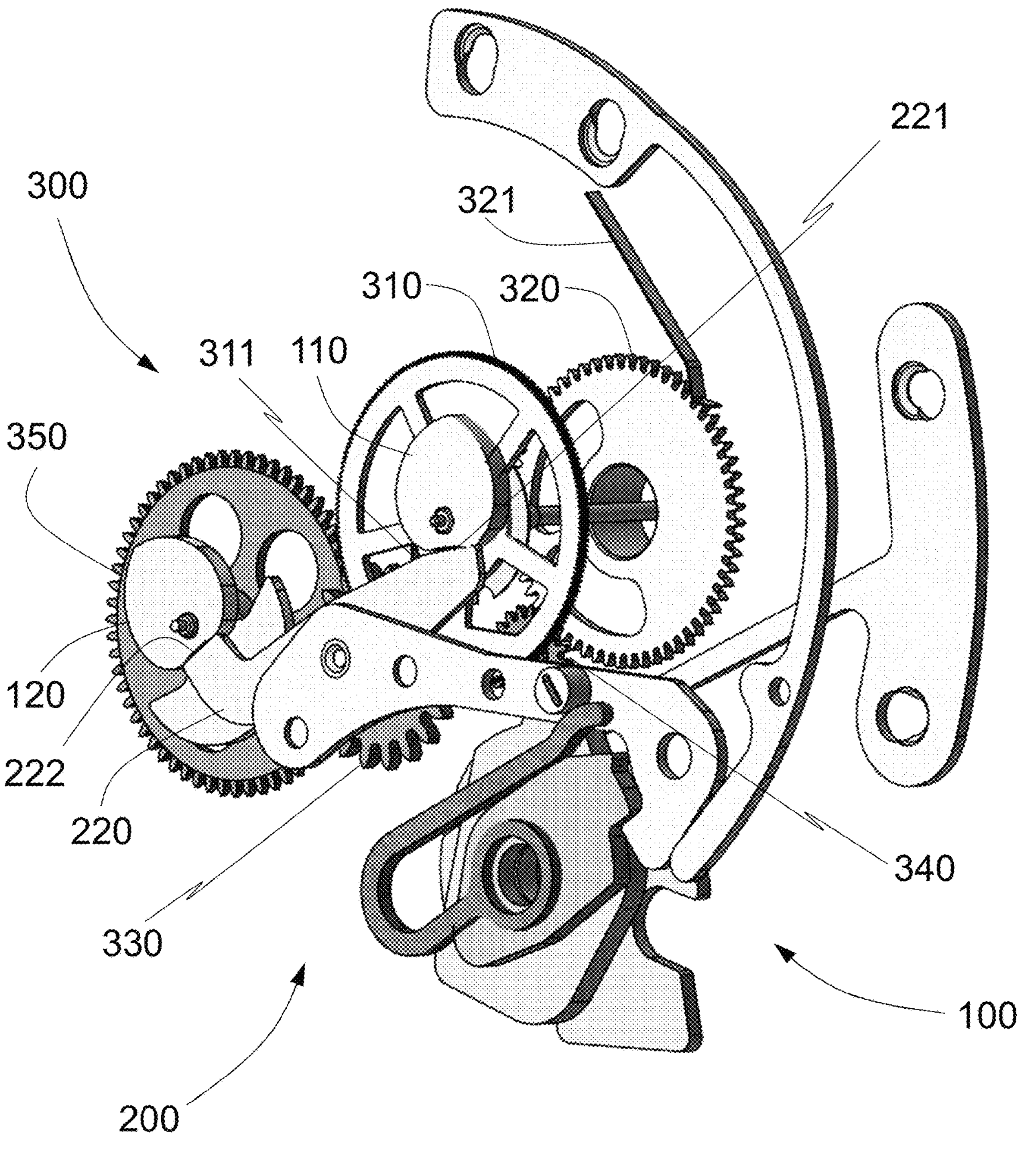
FIG. 1 shows a perspective view of an exemplary embodiment of a zeroing device according to the invention in the zero position.

FIG. 1 shows a perspective view of an exemplary embodiment of a zeroing device 100 according to the invention diagonally from behind, i.e., from the view of the rear side of the chronograph, as well as some other components of the movement 300, which interact with the zeroing device 100. The movement 300 is driven via a pivot drive (not shown here), which brings the gear train of the clock into engagement with the second wheel 310. The second wheel 310 is firmly connected to the center second counter hand (not shown here) via a shaft. The center second and center minute counter hands are each rotatably mounted around the main axis of the movement 300 of the chronograph. A driving spring 311 is firmly connected to the second wheel 310 and is designed to engage in the pulse pickup wheel 330. The pulse pickup wheel 330 is rotatably connected to the drive wheel (hidden in the figure) and the pulse transmission wheel 340 via a multi-function shaft. The drive wheel is in constant engagement with the zeroing wheel 350 and the pulse transmission wheel 340 is in constant engagement with the minute wheel 320, the latter is connected to the center minute counter hand (not shown here) in a torque-transmitting manner. After a complete rotation of the second wheel 310, the pulse pickup wheel 330 is rotated further by one partial unit by the driving spring 311. The rotational movement is passed on to the drive wheel and the pulse transmission wheel 340 via the multi-function shaft, by which the zeroing wheel 350 and the minute wheel 320 are moved further and finally the center minute counter hand advances by one unit. A minute counter catch 321 engages in the minute wheel 320 to count the minutes that have passed during timekeeping.

In the embodiment shown here, the zeroing device 100 comprises, for example, a first zeroing heart 110, a second zeroing heart and a second zeroing heart 120, a minute zeroing heart. The second zeroing heart 110 is firmly connected to the second wheel 310 and the minute zeroing heart 120 is firmly connected to the zeroing wheel 350. By actuating the zeroing unit 200, the second zeroing heart 110 and the minute zeroing heart 120 can be rotated into the zero position shown here, which corresponds to the respective zero position of the center second and center minute counter hands. In an exemplary embodiment of the movement 300 having center second and center minute counter hands, which rotate around the main axis of the movement 300, the second zeroing heart 110 interacts directly in a torque-transmitting manner with the second wheel 310 and the minute zeroing heart 120 acts indirectly in a torque-transmitting manner, via the multi-function shaft, with the drive wheel, and the pulse transmission wheel 340 interacts with the minute wheel 320. Alternatively, the minute zeroing heart 120 could also be connected directly to the minute wheel 320.

The zeroing unit 200 is shown here in the zero position, in which the first end 221 of the zeroing lever bar 220 bears on the second zeroing heart 110 and the second end 222 bears on the minute zeroing heart 120.

Figure 2:
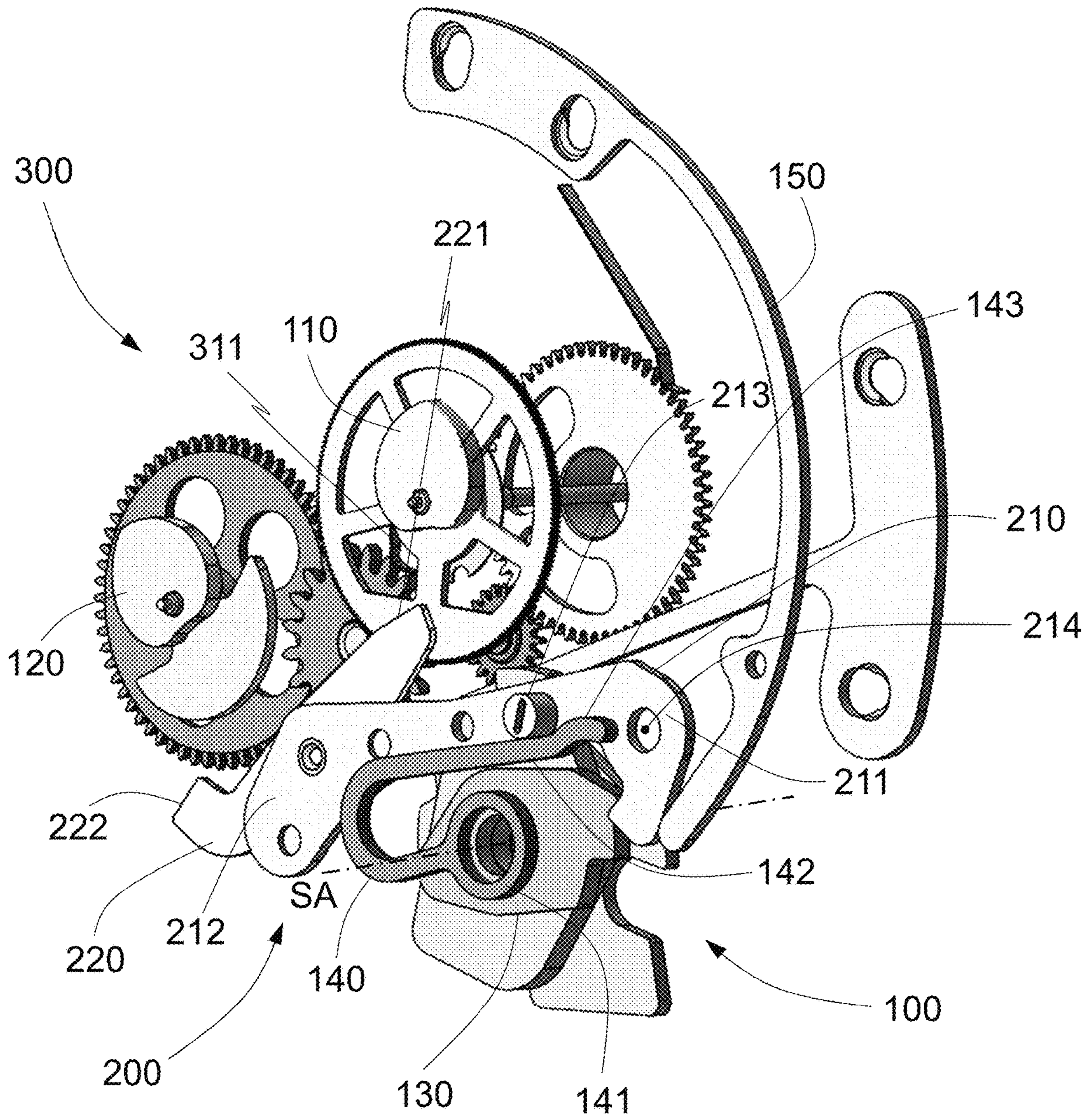
FIG. 2 shows a perspective view of the zeroing device from FIG. 1 in the release position.

In FIG. 2, the zeroing device 100 from FIG. 1 is shown in the same perspective view, but in the release position. The zeroing device 100 comprises the first or second zeroing heart 110 and the second or minute zeroing heart 120, a zeroing unit 200 having the zeroing lever bar 220 and the zeroing lever arm 210, a control means 130, and a first compression spring 140. The control means 130 is implemented here, for example, as a control cam and is mounted in the movement 300 of the chronograph so that is pivotable and/or rotatable around its control means axis of rotation SA. The first compression spring 140 can be designed as a U-shaped bow spring, wherein a fastening end 141, which is rotatably connected to the control means 130, is arranged on one of the legs. The other leg is designed as a free end 142 and is supported on the zeroing lever arm 210, in particular on a bolt-like or pin-like stop 213 of the zeroing lever arm 210. The leg having the free end 142 and the zeroing lever arm 210 extend approximately parallel to one another in the release position of the zeroing unit 200. The zeroing lever arm 210 is rotatably mounted around the zeroing lever arm pivot point 214 at its first end 211. At the second end 212 of the zeroing lever arm 210, the zeroing lever bar 220 is linked on so it is freely pivotable. The bolt-like or pin-like stop 213 is arranged in an area between the first end 211 and the second end 212 of the zeroing lever arm 210, i.e., between the zeroing lever arm pivot point 214 and the connection to the zeroing lever bar 220.

In order to effectuate the zeroing of the zeroing unit 200 shown in FIG. 1, the control means 130 is pivoted around the control means axis SA in the clockwise direction of the movement 300 of the chronograph. The first compression spring 140, which is connected to the control means 130 in a firm or torque-transmitting manner, follows the rotational movement and also pivots in the clockwise direction of the movement 300. Because the compression spring 140 is supported with its free end 142 on the bolt-like or pin-like stop 213 of the zeroing lever arm 210, the latter is pivoted in a movement in the opposite direction to the first compression spring 140 around its zeroing lever arm pivot point

214, specifically in a counterclockwise rotational direction of the movement 300 of the chronograph. The zeroing lever arm 210 and the leg of the first compression spring 140 having the free end 142 shear apart. A pulse generator 143 is formed on the free end 142 of the first compression spring 140, which exerts additional pressure on the zeroing lever arm 210 during the rotational movement of the first compression spring 140 and thus increases its impulse to rotate around the zeroing lever arm pivot point 214.

Due to the pivoting movement of the zeroing lever arm 210, the zeroing lever bar 220 linked on its second end 212 is moved in the direction of the zeroing hearts 110, 120, so that finally the first end 221 of the zeroing lever bar 220 comes into contact with the second zeroing heart 110 and the second end 222 comes into contact with the minute zeroing heart 120. The zeroing unit 200 is then in the zero position (see FIG. 1) Even after reaching the zero position, the spring force of the first compression spring 140 continues to load the zeroing lever arm 210, by which the pressure exerted by the zeroing lever bar 220 on the zeroing hearts 110, 120 is increased and the zeroing unit 200 is permanently forced into the zero position or held therein. Due to the pressure exerted by the zeroing lever bar 220 on the zeroing hearts 110, 120, these are rotated until the zero position is reached, in which the flattened areas of the zeroing hearts 110, 120 bear on the respective ends 221, 222 of the zeroing lever bar 220.

Figure 3:
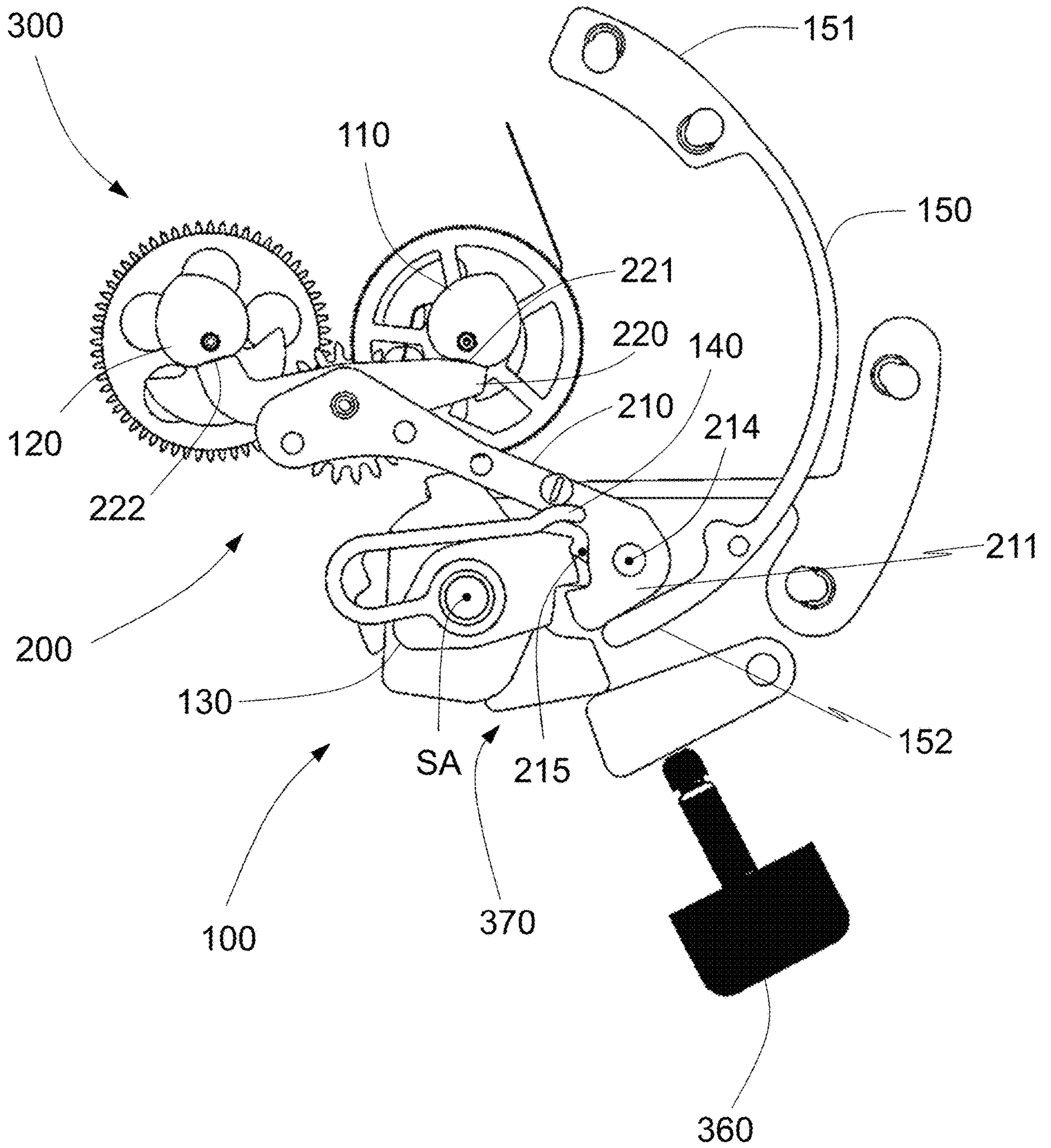
FIG. 3 shows a top view from behind of the zeroing device from FIGS. 1 and 2 in the zero position.

The force acting on the zeroing lever arm 210 or its impulse to rotate around the zeroing lever arm pivot point 214 can be further increased by a second compression spring 150, the function of which is explained in more detail with reference to FIG. 3. FIG. 3 shows a top view from behind, i.e., from the view of the rear side of the chronograph, of the zeroing device 100 from FIGS. 1 and 2. The zeroing unit 200 is in the zero position, in which the two ends 221, 222 of the zeroing lever bar 220 bear on the second or minute zeroing heart 110, 120. So that this contact for zero positioning of the zeroing hearts 110, 120 and the counter arms connected thereto is always achieved, the second compression spring 150 is supported with its free end 152 on the zeroing lever arm 210. The force application point at which the spring force applied by the second compression spring 150 acts on the zeroing lever arm 210 is selected so that the pivoting movement of the zeroing lever arm 210 is deflected from the release position in which the second compression spring 150 is deflected against the spring force acting on the zeroing lever arm 210 (see FIG. 2) to support the zeroing lever arm pivot point 214 in the zero position shown here. At a fastening end 151, the second compression spring 150 is mounted in a stationary manner in the movement 300 via at least one mounting means (not shown).

The spring force of the second compression spring 150 acts permanently on the first end 211 of the zeroing lever arm 210. In order that the second compression spring 150 does not already effectuate the zeroing of the zeroing unit 200 during the timekeeping, the first end 211 of the zeroing lever arm 210 is also operatively connected to the control means 130. For example, the first end 211 of the zeroing lever arm 210 can have a U-shaped receptacle 215. The control means 130 has a corresponding complementary contour and is arranged in relation to the receptacle 215 in such a way that in the release position of the zeroing unit 200, its contour is in locking engagement with the first end 211 of the zeroing lever arm 210 (see FIG. 2 in this regard). By actuating the control means 130, it is pivoted around the control means axis SA in the clockwise direction of the movement 300, by which the locking engagement is released and the contour of the control means 130 lies in the receptacle 215 without contact, as can be seen in FIG. 3. The zeroing lever arm 210 is released and is simultaneously pivoted by the first compression spring 140 and the second compression spring 150 to the zero position of the zeroing unit 200. By using both compression springs 140, 150, the zeroing unit 200 is transferred to the zero position under double spring-loading and is held securely there by the spring forces that continue to act.

Figure 5:
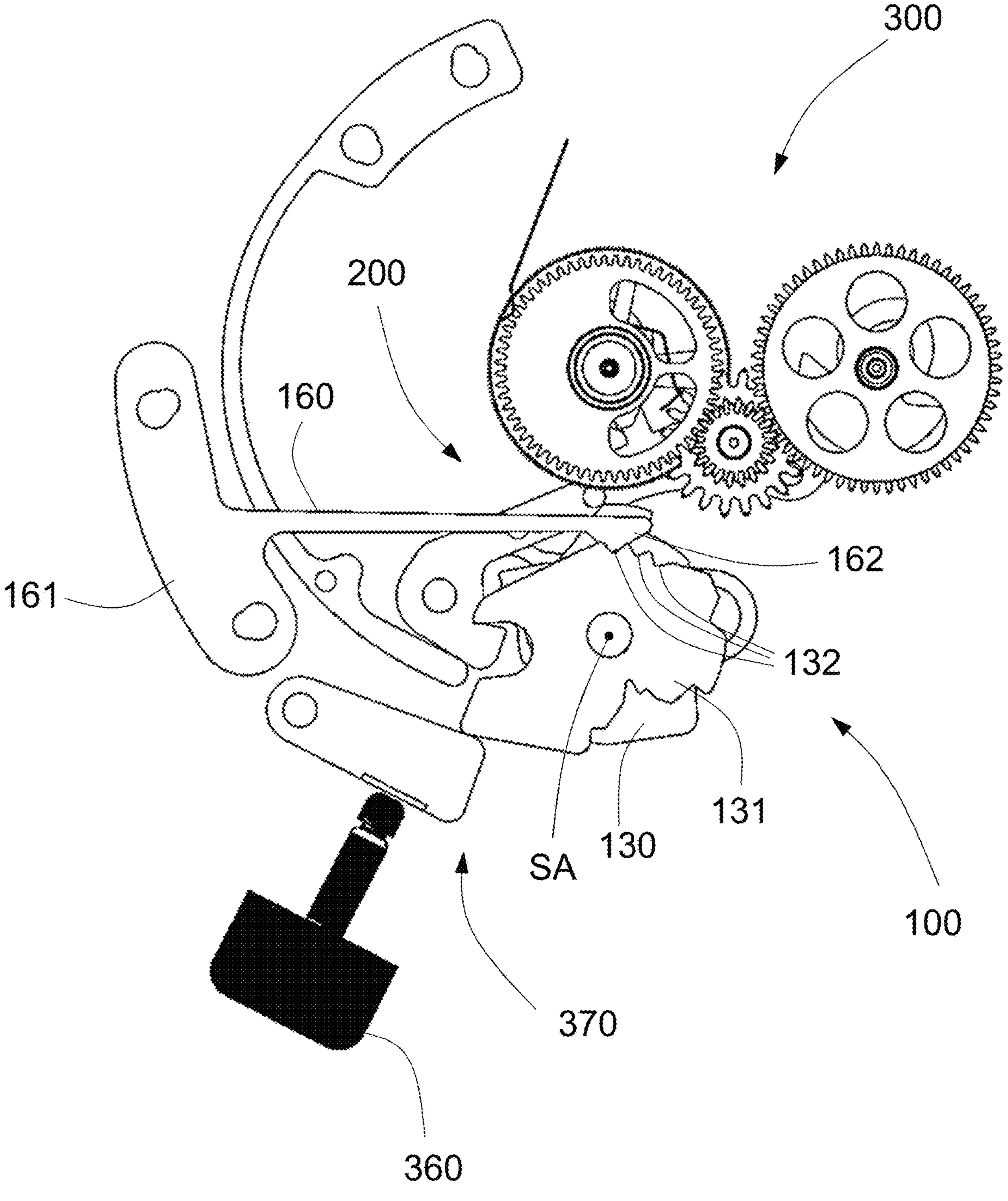
FIG. 5 shows a top view from the front of the zeroing device from FIGS. 1 to 4 in the zero position.

A reset pusher 360 is also shown in each of FIGS. 3 and 5, which protrudes from the housing of the chronograph and can be actuated, “pressed,” by a user to exert a longitudinally directed force or movement. The axial or longitudinal movement of the reset button 370 is converted into the previously described rotational or pivoting movement of the control means 130 by a transmission mechanism 370. The control means 130 is actuated by “pressing” the reset button 360 and pivoted around its control means axis of rotation SA in the clockwise direction of the chronograph.

Figure 4:
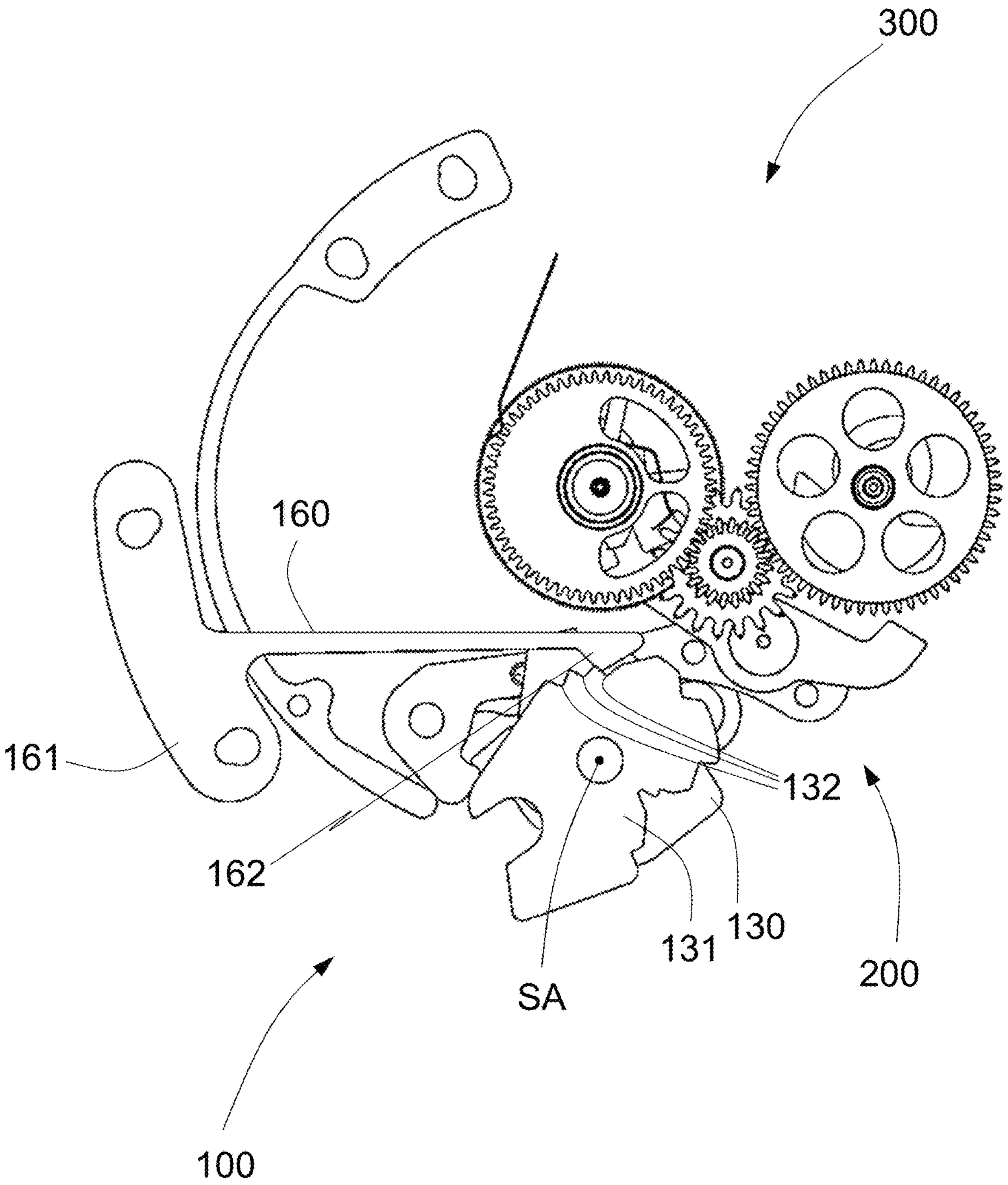
FIG. 4 shows a top view from the front of the zeroing device from FIGS. 1 to 3, in the release position.

FIGS. 4 and 5 each show the zeroing device 100 from a top view from the front, i.e., from the view of the front side of the chronograph. The zeroing unit 200 is shown in the release position in FIG. 4 and in the zero position in FIG. 5.

A third spring 160 can be clearly seen, namely a detent spring, which is mounted in a stationary manner in the movement 300 of the chronograph with its fastening end 161. The free end 162 of the detent spring 160 is designed having a V-shaped lug for engagement in complementary V-shaped receptacles 132 arranged on the outer contour of a detent means 131, in particular a detent cam. The detent means 131 represents a component of the control means 130 and is mounted in a floating manner thereon and is pivotable or rotatable around the control means axis of rotation SA. The free end 162 of the detent spring 160 cooperates with the control means 130 via the detent means 131 in order to lock it into the position effectuating the zeroing of the zeroing unit 200. In the embodiment shown here, the detent means 131 has a total of three V-shaped receptacles 132 extending along the outer contour. In the release position of the zeroing unit 200, according to FIG. 4, the V-shaped lug of the detent spring 160 engages in the frontmost receptacle 132 in the rotational direction of the detent means 131. When the control means 130 is actuated, the detent means 131 also rotates in the clockwise direction of the chronograph around the control means axis SA. The detent spring 160 attempts to lock completely into the V-shaped receptacles 132 and thereby slides on the slope of the outer contour of the detent means 131. For the case that the detent spring 160 does not engage centrally in the V-shaped receptacles 132, the detent spring 160 will attempt to turn the detent means 131 away in one direction and thus precisely effectuate the desired position of the control means 130 for the zero position of the zeroing unit 200. In order to effectuate the zero position of the zeroing unit 200 shown in FIG. 5, the reset button 360 is pressed. The transmission mechanism 370 converts the linear movement of the reset button 360 into a pivot movement of the detent means 131 or the control means 130 around the control means axis of rotation SA in the clockwise direction of the chronograph. In the zero position of the zeroing unit 200, the V-shaped lug of the detent spring 160 engages in the rearmost receptacle 132 in the rotational direction of the detent means 131. Further securing of the zeroing unit 200 in the zero position is thus provided by means of the third spring 160. By actuating a start/stop button (not shown here), the zero position can be released and the zeroing unit 200 can be returned to the release position, which enables further time-keeping.

Preferably and as can be clearly seen in particular in FIGS. 1 and 2, the first compression spring 140 and the second compression spring 150 are arranged offset from one another with respect to the Z coordinate direction of the movement 300. In particular, the second compression spring 150 is supported frontally for this purpose on the outer contour of the zeroing lever arm 210 and is arranged in a common plane with the zeroing lever arm 210 and the control means 130 with respect to the Z coordinate direction. The first compression spring 140, on the other hand, is supported on the bolt-like or pin-like stop 213 of the zeroing lever arm 210 protruding from the common plane and, from the perspective of the front side of the chronograph, is arranged together with the bolt-like or pin-like stop 213 in an underlying or lower plane. The third spring or detent spring 160 is in turn arranged offset from the first and second compression springs 140, 150 with respect to the Z coordinate direction and is located together with the detent means 131 in an upper plane lying above the common plnae from the perspective of the front side of the chronograph.

Figure 6:
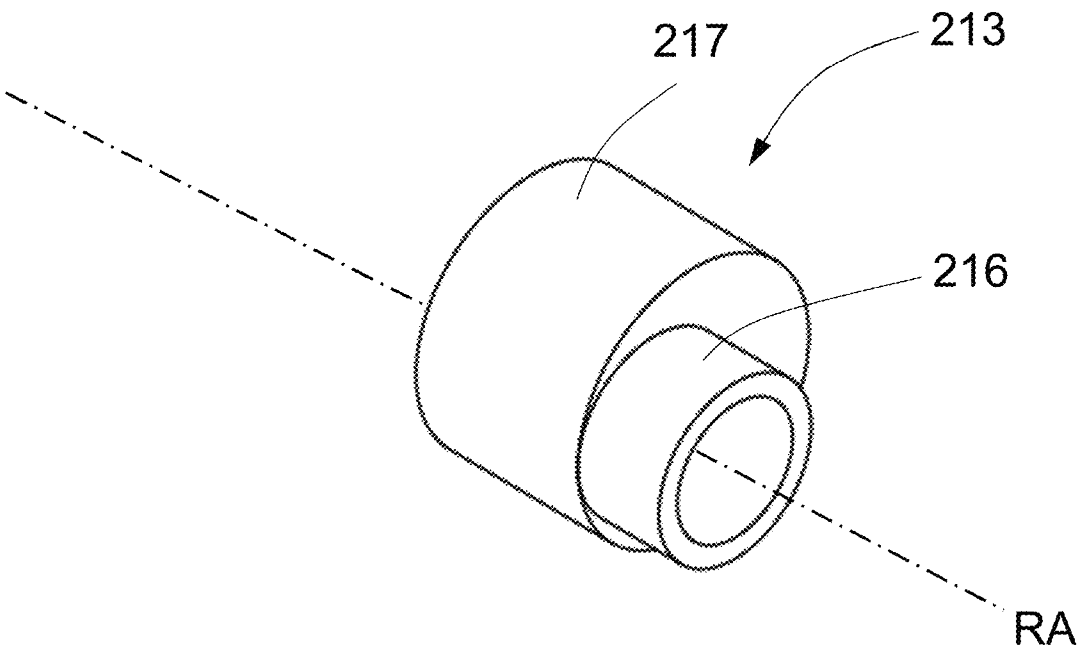
FIG. 6 shows a perspective detailed view of an exemplary embodiment of a bolt-like or pin-like stop.
Figure 7:
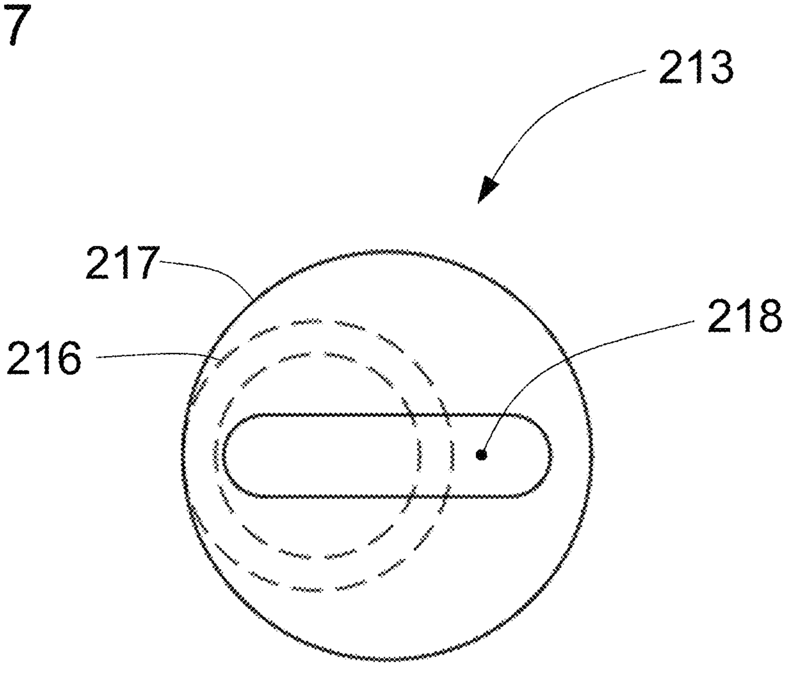
FIG. 7 shows a top view from behind of the bolt-like or pin-like stop from FIG. 6.

Finally, FIGS. 6 and 7 each show a detailed view of an exemplary embodiment of the bolt-like or pin-like stop 213 which is fastened on the zeroing lever arm 210. In this embodiment, the bolt-like or pin-like stop 213 is designed as an eccentric, having an upper cylindrical section 216 with respect to the longitudinal axis and a lower cylindrical section 217 arranged eccentrically underneath. The upper cylindrical section 216 is intended for connection to a receptacle, in particular a bore, of the zeroing lever arm 210. The lower cylindrical section 217 protrudes from the zeroing lever arm 210 so that the first compression spring 140 can be supported thereon (see, for example, FIG. 1). In addition, the lower cylindrical section 217 has a slot or a groove 218, which, with the aid of a corresponding tool, for example a screwdriver, allows the bolt-like or pin-like stop 213 to rotate in the receptacle of the zeroing lever arm 210 around the axis of rotation RA of the upper cylindrical section 216. Due to the eccentric arrangement of the lower cylindrical section 217, it follows a circular path on the zeroing lever arm 210, by which the position of the stop 213 relative to the first compression spring 140 can be changed. In this way, the spring force of the first compression spring 140, which is supported on the bolt-like or pin-like stop 213, is adjustable with high precision for fine adjustment of the zeroing device 100.

LIST OF REFERENCE NUMERALS

- 100 zeroing device
- 110 first zeroing heart, in particular second zeroing heart
- 120 second zeroing heart, in particular minute zeroing heart
- 130 control means, in particular control cam
- 131 detent means, in particular detent cam
- 132 V-shaped receptacle
- 140 first compression spring
- 141 fastening end of the first compression spring
- 142 free end of the first compression spring
- 143 pulse generator
- 150 second compression spring
- 151 fastening end of the second compression spring
- 152 free end of the second compression spring
- 160 third spring, in particular detent spring
- 161 fastening end of the third spring
- 162 free end of the third spring
- 200 zeroing unit
- 210 zeroing lever arm
- 211 first end of the zeroing lever arm
- 212 second end of the zeroing lever arm
- 213 bolt-like or pin-like stop
- 214 zeroing lever arm pivot point
- 215 receptacle
- 216 upper cylindrical section
- 217 lower cylindrical section
- 218 groove
- 220 zeroing lever bar
- 221 first end of the zeroing lever bar
- 222 second end of the zeroing lever bar
- 300 movement
- 310 second wheel
- 311 driving spring
- 320 minute wheel
- 321 minute counter catch
- 330 pulse pickup wheel
- 340 pulse transfer wheel
- 350 zeroing wheel
- 360 reset button
- 370 transmission mechanism
- RA axis of rotation
- SA control means axis of rotation

The invention claimed is:

1. A zeroing device (100) for a movement (300) of a chronograph, comprising at least one zeroing heart (110, 120), a zeroing unit (200), which has a zeroing lever arm (210) and a zeroing lever bar (220), a first end (221) of which bears on the at least one zeroing heart (110, 120), and a control means (130) which interacts with the zeroing lever arm (210), wherein a zero position of the zeroing unit (200) is effectuated by actuating the control means (130), characterized in that the zeroing device (100) comprises a first compression spring (140) which is supported on the zeroing lever arm (210) and is operatively connected to the control means (130), and the control means (130) interacts indirectly, via the first compression spring (140), with the zeroing unit (200).

2. The zeroing device (100) according to claim 1, characterized in that the zeroing lever arm (210) has a bolt-like or pin-like stop (213) on which the first compression spring (140) is supported.

3. The zeroing device (100) according to claim 2, characterized in that the bolt-like or pin-like stop (213) is an eccentric for adjusting and fine-tuning a spring force exerted by the first compression spring (140) on the zeroing lever arm (210).

4. The zeroing device (100) according to claim 1, characterized in that the first compression spring (140) has a fastening end (141) and a free end (142), wherein the fastening end (141) is directly connected to the control means (130) and the free end (142) is supported on the zeroing lever arm (210).

5. The zeroing device (100) according to claim 4, characterized in that the first compression spring (140) is a U-shaped bow spring, wherein the fastening end (141) connected to the control means (130) is arranged on one leg and the free end (142) supported on the zeroing lever arm (210) is arranged on the other leg.

6. The zeroing device (100) according to claim 1, characterized in that the zeroing lever arm (210) and the first compression spring (140) carry out a movement in opposite directions to one another by actuating the control means (130) in order to effectuate the zeroing of the zeroing unit (200).

7. The zeroing device (100) according to claim 6, characterized in that the first compression spring (140) is connected to the control means (130) in a torque-transmitting manner, and the zeroing lever arm (210) is mounted at its first end (211) so that it is rotatable or pivotable around a zeroing lever arm pivot point (214) and is connected at its second end (212) to the zeroing lever bar (220), so that a rotational or pivot movement of the control means (130) around its control means axis of rotation (SA) results in a rotational or pivot movement of the first compression spring (140) in the same direction and a rotational or pivot movement of the zeroing lever arm (210) in the opposite direction.

8. The zeroing device (100) according to claim 7, characterized in that the first compression spring (140) is supported in an area of the zeroing lever arm (210) between the connection to the zeroing lever bar (220) and the rotatable or pivotable mounting on the zeroing lever arm (210).

9. The zeroing device (100) according to claim 1, characterized in that the zeroing device (100) comprises a second compression spring (150) with a free end (152), which is mounted in a stationary manner in the movement (300) of the chronograph, and the free end (152) is supported on the zeroing lever arm (210) by exerting a spring force that causes the zeroing of the zeroing unit (200).

10. The zeroing device (100) according to claim 9, characterized in that the first compression spring (140) is offset from the zeroing lever arm (210) with respect to the Z coordinate direction of the movement (300) of the chronograph and the second compression spring (150) is arranged in a common plane with the zeroing lever arm (210) with respect to the Z coordinate direction.

11. The zeroing device (100) according to claim 1, characterized in that the control means (130) is in locking engagement with the second end (212) of the zeroing lever arm (210), which engagement is releasable by actuating the control means (130) to effectuate the zeroing of the zeroing unit (200).

12. The zeroing device (100) according to claim 11, characterized in that the second end (212) of the zeroing lever arm (210) has a receptacle (215) and the control means (130) has a complementary contour for engaging in the receptacle (215) of the zeroing lever arm (210).

13. The zeroing device (100) according to claim 10, characterized in that the zeroing device (100) comprises a third spring (160) with a free end (162), which is mounted in a stationary manner in the movement (300) of the chronograph, and the free end (162) interacts with the control means (130).

14. The zeroing device (100) according to claim 13, characterized in that the free end (162) of the third spring (160) is transferable by actuating the control means (130) into an engagement that holds the control means (130) in the position effectuating a zero position.

15. The zeroing device (100) according to claim 14, characterized in that the third spring (160) is arranged offset from the zeroing lever arm (210) and offset from the first compression spring (140) with respect to the Z coordinate direction of the movement (300) of the chronograph.

16. The chronograph having the zeroing device (100) according to claim 1 and having a center second counter hand and a center minute counter hand which are each mounted rotatably around the main axis of the movement (300) of the chronograph, wherein the center second counter hand is connected to a second wheel (310) and the center minute counter hand is connected to a minute wheel (320), characterized in that the zeroing lever bar (220) of the zeroing device (100) has a first end (221) for contact on a first zeroing heart (110), a second zeroing heart, and a second end (222) for contact on a second zeroing heart (120), a minute zeroing heart, and zeroing of the zeroing unit (200) can be effectuated by actuating the control means (130), wherein the control means (130) interact with the zeroing unit (200) via the first compression spring (140) supported on the zeroing lever arm (210), and wherein the second zeroing heart (110) interacts directly in a torque-transmitting manner with the second wheel (310) and the minute zeroing heart (120) interacts indirectly in a torque-transmitting manner with the minute wheel (320) in order to cause a reset of the center second counter hand and the center minute counter hand to their zero position.

* * * * *